United States Patent [19]

Vegge

[11] Patent Number: 4,663,844

[45] Date of Patent: May 12, 1987

[54] DEVICE FOR CUTTING AN ELECTRODE CASING

[75] Inventor: Olaf T. Vegge, Vågsbygd, Norway

[73] Assignee: Elkem a/s, Oslo, Norway

[21] Appl. No.: 856,716

[22] Filed: Apr. 28, 1986

[30] Foreign Application Priority Data

May 30, 1985 [NO] Norway ................................ 852184

[51] Int. Cl.⁴ ........................ B23D 21/00; B26D 3/16; B26D 3/28

[52] U.S. Cl. .......................................... 30/100; 30/96; 30/102; 83/830; 83/743; 83/924; 82/70.1; 29/746

[58] Field of Search ...................... 30/96, 98, 100, 101, 30/102; 82/70.1, 71; 83/830, 743, 861, 748, 564.4, 924; 29/234, 280, 282, 746

[56] References Cited

U.S. PATENT DOCUMENTS

| | | | |
|---|---|---|---|
| 779,305 | 1/1905 | Oliver | 30/96 |
| 930,755 | 8/1909 | Holland | 30/100 X |
| 1,279,022 | 9/1918 | Scott | 30/96 |
| 1,665,089 | 4/1928 | Gaffney | 30/100 |
| 3,117,375 | 1/1964 | Meese | 30/96 |
| 3,763,559 | 10/1973 | Aybjer | 30/100 |

Primary Examiner—Donald R. Schran
Attorney, Agent, or Firm—Lucas & Just

[57] ABSTRACT

The present invention relates to a device for cutting the casing on baked carbon electrodes. The device comprises a ring (1) which is freely suspended about the electrode. At least two clamping shoes (7) having vertical extending cutting edges (17) are pivotably suspended to the ring (1). The clamping shoes (7) can be pressed against the casing (3) by means of first hydraulic cylinders (14). On the top of the ring (1) a chain (18) having a plurality of cutting wheels (19) is arranged. One end of the chain (18) is secured to a second hydraulic cylinder (26) and the other end is secured to the piston (27) of the second hydraulic cylinder (26), whereby the chain (18) can be tightened about the periphery of the electrode (2). A third hydraulic cylinder (29) is secured to the ring (1) while the piston (28) of the third hydraulic cylinder (29) is secured to the claim (18), whereby the chain (18) can be moved backwards and forwards along the circumference of the casing (3).

7 Claims, 4 Drawing Figures

DEVICE FOR CUTTING AN ELECTRODE CASING

The present invention relates to a device for cutting a steel casing on baked carbon electrodes.

Self-baking carbon electrodes which are produced in direct connection with the furnaces in which they are used, have for a long time been used in electrothermaical smelting furnaces. The electrodes comprise an outer steel casing into which unbaked electrode paste consisting of a carbon material and a carbonaceous binder is charged. Under supply of heat the unbaked electrode paste is baked into a solid carbon electrode. As the electrode is consumed in the furnace, new sections of steel casing are welded on the top of the electrode casing and more unbaked electrode paste is charged into the casing. In this way a continuous string of carbon electrode is produced.

Normally, the steel casing is consumed in the furnace together with the carbon electrode. However, for processes where the iron in the steel casing will contaminate the metal or alloy which is produced in the furnace, the steel casing has to be removed from the carbon electrode before the casing enters into the furnace heart, but after the electrode is fully baked.

Electrothermical smelting furnaces of the above mentioned kind are usually equipped with three carbon electrodes. Due to furnace equipment such as charging tubes, bus bars, etc. it is a very limited free space in the area of the electrodes above the furnace roof or smoke hood. In addition, due to danger of electric flash-over, the furnace operators usually are not allowed to work in the area of the electrodes when the furnace is operating. In order to cut and remove the steel casing manually by means of cutting torch, angular milling cutter or the like, it is therefore necessary to shut down the furnace when manually cutting of the electrode casing is done. With an electrode consumption of about ½ to about 1 meter pr. electrode pr. day this will give an unacceptable high loss of production if the furnace has to be shut down in order to cut and remove the casing.

The object of the present invention is to provide a device for cutting of steel casings on baked carbon electrodes whereby the casing is cut both horizontally and vertically in order to split the casing into small pieces which can be easily removed. It is a further object of the present invention to provide a device which can be operated by remote control or authomatically after a pre-set program. In this way it will not be necessary to shut down the furnace operation during cutting and removing of the electrode casing.

Accordingly the present invention relates to a device for cutting of the casing on baked carbon electrodes, which device comprises a ring having a diameter which is greater than the diameter of the electrode, said ring being freely suspended about the electrode, at least two clamping shoes which can be clamped against the electrode casing by means of first hydraulic cylinders said first hydraulic cylinders being connected to the freely suspended ring. The clamping shoes are equipped with vertically cutting edges. On the top of the freely suspended ring there is arranged a chain having a plurality of cutting edges, which chain can be tightened about the periphery of the electrode casing by means of a second hydraulic cylinder. A third hydraulic cylinder is at one end connected to a bracket on the freely suspended ring, while the other end of the hydraulic cylinder is connected to the chain, whereby the chain can be moved horizontally backwards and forwards over a part of the periphery of the electrode casing.

In order to cut a casing the following sequence is executed:

The clamping shoes are clamped against the electrode casing. The cutting edges on the clamping shoes will thereby cut the casing vertically at the same time as the clamping shoes will fix the ring relative to the electrode. Thereafter the chain which is arranged on the ring is tightened whereby the cutting edges are pressed against the electrode casing. The electrode casing is now cut horizontally by moving the piston of the third hydraulic cylinder in and out. The chain and the cutting edges on the chain will thereby be moved horizontally backwards and forwards over the periphery of the casing. The cutting edges will thereby cut the casing horizontally.

By repeating this sequence the casing is cut both vertically and horizontally and the casing can be removed in form of relatively small pieces.

According to a preferred embodiment of the present invention, the cutting edges on the clamping shoes have a zig-zag form. This will improve the cutting ability of the cutting edges.

According to another preferred embodiment of the present invention the cutting edges on the chain are in the form of cutting wheels.

In order to prevent damages and cracks on the baked electrode the height of the cutting edges on the clamping shoes and the height of the cutting edges on the chain are limited to maximum three times the thickness of the electrode casing.

According to another embodiment of the present invention a guide ring for the chain in the form of a rod iron or the like is secured on the top of the freely suspended ring. The chain is on its lower end equipped with at least three brackets which at their lower ends are inclined outwards and downwards seen from the electrode. These brackets are intended to slide on the guide ring which are secured on the top of the freely suspended ring, so that when the chain is tightened about the electrode, the chain will be guided upwardly and towards the electrode and when the chain is loosened, it will slide downwardly and away from the electrode.

In order to prevent relative movement between the device and the electrode when the freely suspended ring is fixed to the electrode by means of the clamping shoes, an automatic interlock is arranged, whereby the electrode can not be moved upwards and downwards when the clamping shoes of the cutting device are pressed against the electrode casing.

A preferred embodiment of the device according to the present invention will now be described in connection with the drawing where, FIG. 1 shows a side elevation of the device according to the present invention;

Figure 1:
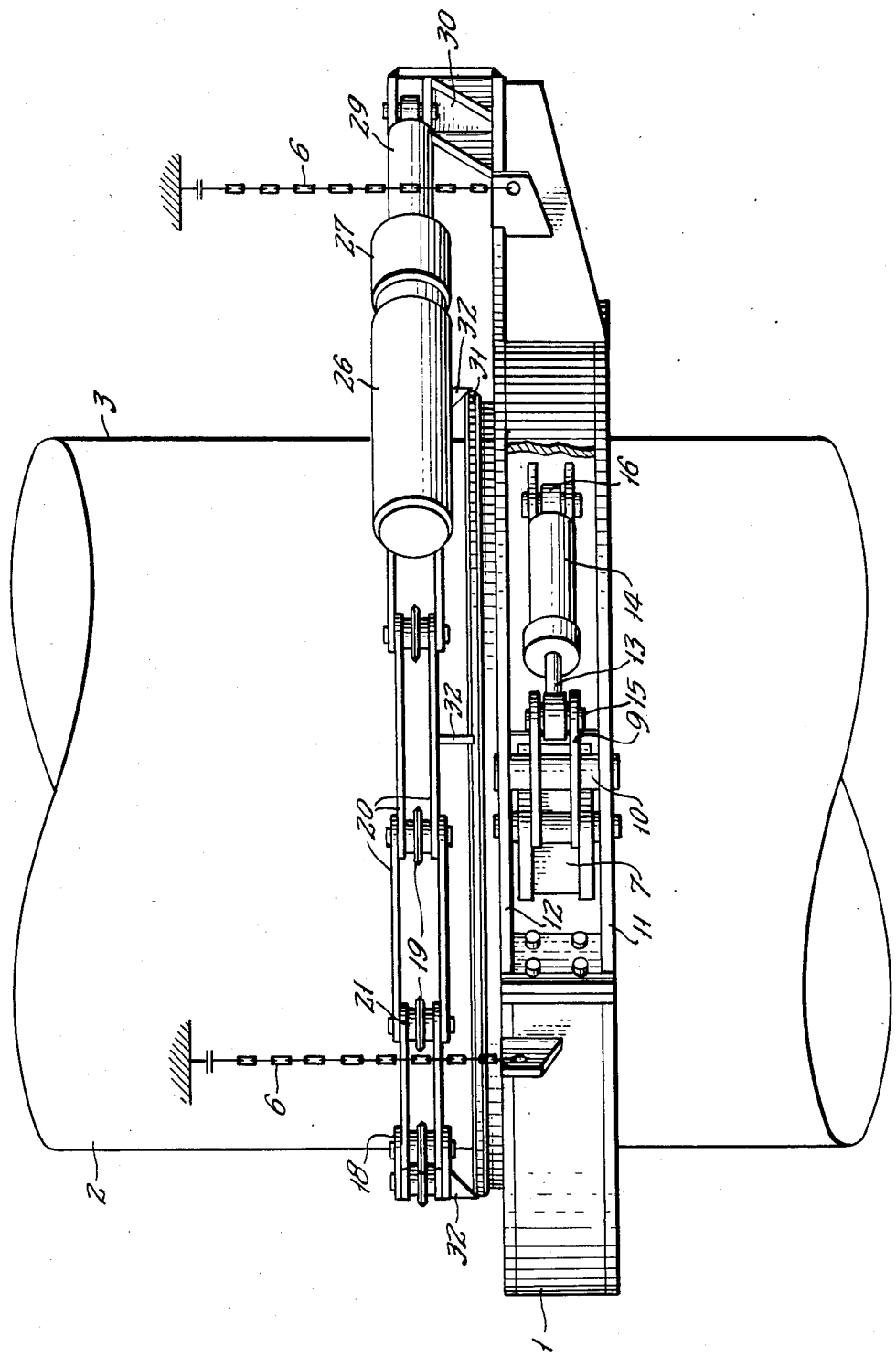

The device according to the present invention comprises a ring 1 which is horizontally arranged about an electrode 2 having a steel casing 3. The electrode 2 is baked by heating unbaked electrode paste, the baking zone being well above the level where the device of the present invention is arranged. The electrode is thus fully baked when it reaches the level of the cutting device.

The ring 1 is preferably built up from a number of sections made from channel-iron which sections are connected to each other by means of bolts and nuts 4, welding or the like in flanges 5. The ring 1 can thereby be mounted and demounted in a very simple and fast way.

The ring 1 is freely suspended from the building or the electrode frame (not shown) by means of wires or chains 6.

Figure 2:
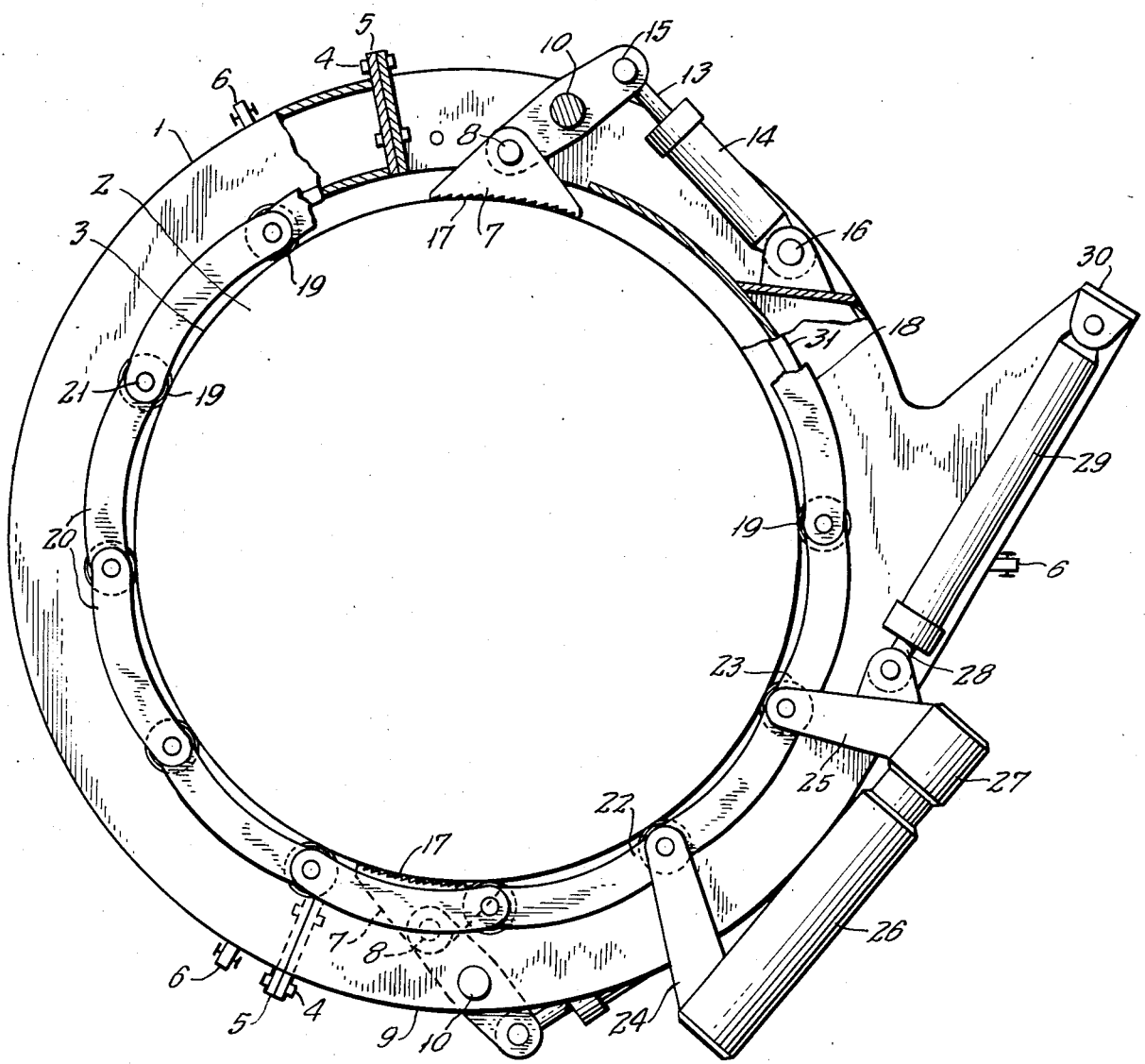
FIG. 2 shows a top elevation of the device according to the present invention, with parts cut away.

To the ring 1 at least two clamping shoes 7 are pivotably suspended. As shown in FIG. 1 and 2 each of the clamping shoes 7 is pivotably suspended to one end of an arm 9 by means of a first bolt 8. The arm 9 is at its center pivotably connected to the ring 1 by means of a second bolt 10 which runs through flanges 11 and 12 on the ring 1. In its other end the arm 9 is pivotably secured to the piston 13 of a first hydraulic cylinder 14 by means of a third bolt 15. The hydraulic cylinder 14 is pivotably secured to the ring 1 at 16.

The first hydraulic cylinders 14 which via the arms 9 are secured to the clamping shoes 7 have hoses for a hydraulic fluid (not shown) which hoses are interconntected in such a way that the first hydraulic cylinders 14 will be operated simultaneously. When the pistons 13 of the first hydraulic cylinders 14 are moved outwards, the clamping shoes 7 will press against the electrode casing 3. The ring 1 will thereby be fixed relative to the electrode 2. This position is shown in FIG. 1 and 2. When the pistons 13 are moved inwardly, the clamping shoes 7 will move away from the electrode and the ring 1 will be released from the electrode 2.

The clamping shoes 7 are on the side which faces against the electrode casing, equipped with vertical running cutting edges 17. When the clamping shoes 7 are pressed against the electrode casing 3, as described above, the cutting edges 17 will thereby cut through the electrode casing 3. On FIG. 1 and 2, two clamping shoes 7 having cutting edges 17 are shown and the electrode casings will thus have two vertical cuts.

The device according to the present inventions can, however, be equipped with more than two clamping shoes 7 having cutting edges 17, in order to cut the casing 3 into smaller pieces.

Upon the ring 1 there is arranged a chain 18 comprising a plurality of cutting wheels 19 and links 20. The links 20 and the cutting wheels 19 are pivotably secured to each other by means of bolts 21 which runs through holes in the center of the cutting wheels 19. The chain 18 has a length which is somewhat smaller than the circumference of the electrode 2. To the ends 22 and 23 of the chain 18 there are secured brackets 24 and 25 which are secured to respectively the end of a second hydraulic cylinder 26 and the outer end of the piston 27 of the second hydraulic cylinder 26. When the piston 27 is moved inwardly the chain 18 will be tightened about the periphery of the electrode casing 3 and the cutting wheels 19 will be pressed against the electrode casing. When the piston 27 is moved outwardly the chain 18 and thereby the cutting wheels 19 will move away from the electrode. To the bracket 25 a piston 28 of a third hydraulic cylinder 29 is secured. The end of the third hydraulic cylinder is secured to a bracket 30 on the ring 1.

In order to cut the electrode casing 3 horizontally by means of the cutting wheels 19, the following cycle is followed;

The ring 1 is fixed relative to the electrode 2 by clamping the clamping shoes 7 against the electrode casing 3. As described above, the casing 3 is thereby cut vertically. While the ring 1 in this way is fixed relative to the electrode 2, the cutting wheels 19 are pressed against the electrode casing 3 by moving the piston 27 of the second hydraulic 26 cylinder inwardly. Thereafter the piston 28 on the third hydraulic cylinder 29 is moved in and out. The cutting wheels 19 will thereby move horizontally backwards and forwards on the electrode casing 3 and cut a horizontal cut in the electrode casing 3. In order to obtain a full horizontal cut of the whole circumference of the electrode casing 3, the length of the movement of the piston 28 of the third hydraulic cylinder 29 must be so long that the cutting wheels 19 move a distance which at least equals the distance between each of the cutting wheels 19.

When the casing 3 has been cut horizontally, the chain 18 is released by moving the piston 27 of the second hydraulic cylinder 27 outwardly, whereafter the clamping shoes 7 are released from the electrode. The whole device will thereby be released from the electrode 2.

As the electrode casing 3 now has been cut both vertically and horizontally, the individual pieces of the electrode casing 3 can now be removed either manually or, an inclined chute or the like can be arranged into which the pieces of the electrode casing can fall and slide away from the electrode area.

As mentioned above, the chain 18 is freely resting upon the ring 1. In order to ensure a safe guiding of the chain, a guiding ring 31 made from rod-iron is preferably secured to the top of the ring 1 by means of welding or the like.

The chain 18 is guided against the ring 31 by means of at least three brackets 32 which are fixed to the underside of the chain 18. The brackets 32 are inclined outwards and downwards seen from the electrode. The inclined sides of the brackets 32 are intended to rest on the top of the guiding ring 31 whereby the chain 18 is guided when the chain is being tightened or released.

Figure 3:
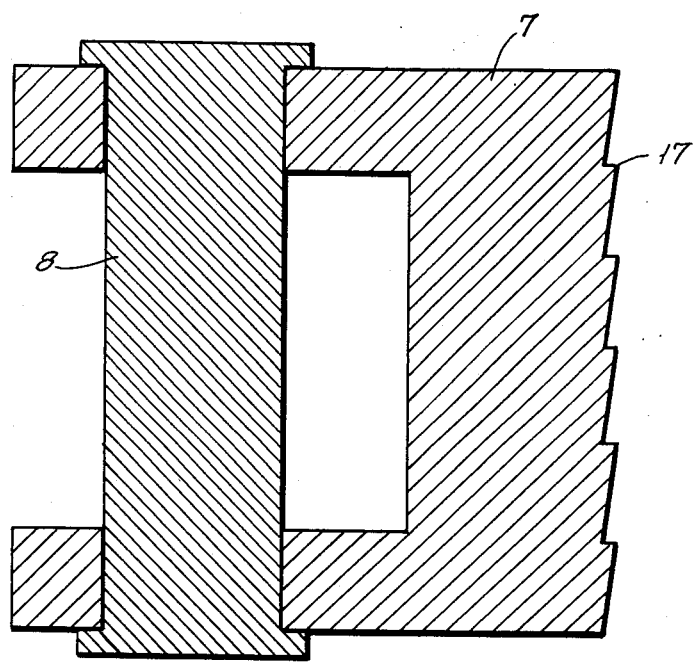
FIG. 3 shows a vertical section along line I—I in FIG. 2.

In order to ensure that the electrode casing 3 is cut through, the cutting edges 17 on the clamping shoes 7 have as shown on FIG. 3, preferably a zig-zag form. A better cutting ability is thereby obtained.

Figure 4:
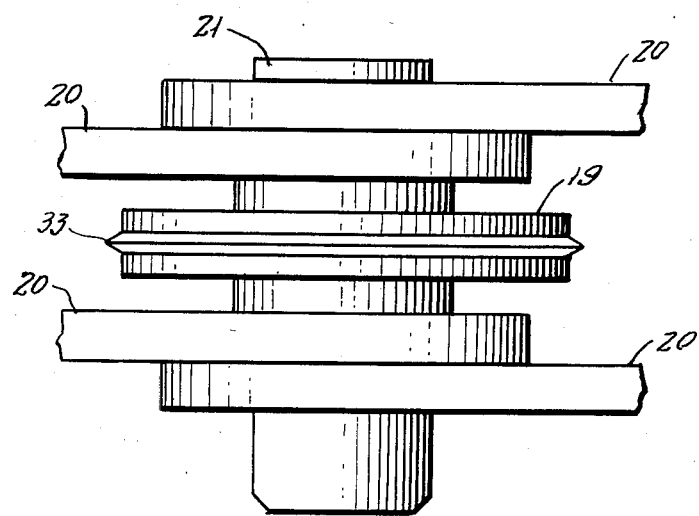
FIG. 4 shows part of FIG. 2 in an enlarged scale.

On FIG. 4 the cutting wheels 19 are shown in more detail. The cutting edges 33 on the cutting wheels 19 extend preferable only over a part of the width of the cutting wheels 19. It is thereby ensured that the cutting wheels 19 do not cut deeper than the height of the cutting edges 33. In order to avoid damages of the carbon electrode 2 the height of the cutting edges 33 is limited to maximum three times the thickness of the casing.

What is claimed

1. A device for cutting a casing (3) on a baked carbon electrode (2) characterized in that the device comprises a ring (1) which is freely suspended about the electrode (2), at least two clamping shoes (7) which are pivotably secured to the ring (1) and which can be clamped against the periphery of the casing (3) of the electrode (2) by means of first hydraulic cylinders (14), said clamping shoes (7) having vertical cutting edges (17) for vertical cutting of the electrode casing (3), a chain (18) arranged upon the ring (1) said chain (18) having a plurality of cutting edges (33) wherein one end of the chain (18) is secured to a second hydraulic cylinder (26) and the other end of the chain (18) is secured to the piston (27) of the second hydraulic cylinder (26) whereby the chain (18) can be tightened about the periphery of the electrode (2), and a third hydraulic cylinder (29) which is secured to the ring (1), while the piston (28) of the third hydraulic cylinder (29) is secured to the chain (18), whereby the chain (18) can be moved horizontally backwards and forwards over the curcumference of the electrode casing (3) over a distance which at least equals the distance between each of the cutting edges (33).

2. Device according to claim 1, characterized in that the cutting edges (17) on the clamping shoes (7) have zig-zag form.

3. Device according to claim 1, characterized in that the cutting edges (33) on the chain (18) are in the form of cutting wheels (19).

4. Device according to claim 1, characterized in that a guide ring (31) for the chain (18) is arranged on the top of the ring (1).

5. Device according to claim 4, characterized in that at least three brackets (32) are secured to the underside of the chain (18), said brackets (32) being inclined downwardly and outwardly seen from the electrode (2) the brackets (32) being arranged to guide the chain (18) against the guide ring (31).

6. Device according to claim 1, characterized in that the height of the cutting edges (17) on the clamping shoes (7) and on the cutting edges (33) on the cutting wheels (19) is maximum three times the thickness of the casing.

7. Device according to claim 1, characterized in that the clamping shoes (7) are pivotably connected to the first hydraulic cylinders (14) by means pivotably arms (9) which at their centers are connected to the ring (1) by means of bolts (15).

* * * * *